United States Patent [19]

Zimmerman et al.

[11] 4,379,188
[45] Apr. 5, 1983

[54] SURFACE HYDROLYZED OLEFIN-VINYL ESTER CONTAINER COATINGS

[75] Inventors: Alfred B. Zimmerman, Fairfield; Leroy J. Memering, Cincinnati, both of Ohio

[73] Assignee: National Distillers & Chemical Corp., New York, N.Y.

[21] Appl. No.: 303,258

[22] Filed: Sep. 17, 1981

Related U.S. Application Data

[63] Continuation of Ser. No. 140,509, Apr. 15, 1980, abandoned.

[51] Int. Cl.³ .................. B05D 1/06; B05D 3/04; B05D 3/10; B65D 23/08
[52] U.S. Cl. ................ 428/35; 215/12 R; 215/DIG. 6; 427/27; 427/185; 427/341; 427/377; 427/389.7; 427/421; 427/434.4; 428/442
[58] Field of Search ............... 427/13, 27, 341, 377, 427/389.7, 185, 430.1, 400, 434.4; 215/DIG. 6, 12 R; 428/442, 35

[56] References Cited

U.S. PATENT DOCUMENTS

| 3,554,787 | 1/1971 | Plymak | 427/421 |
| 3,805,985 | 4/1974 | Hagiwara et al. | 427/13 |
| 4,163,702 | 8/1979 | Rickert | 427/341 |

FOREIGN PATENT DOCUMENTS 823149  9/1969  Canada ........................ 427/377

Primary Examiner—Michael R. Lusignan
Assistant Examiner—Janyce A. Bell
Attorney, Agent, or Firm—Kenneth D. Tremain

[57] ABSTRACT

A container is provided with a coating having a frosty appearance comprising an olefin-vinyl ester copolymer the exterior surface of which is hydrolyzed following application of the coating to the exterior surface container. Surface hydrolysis of the olefin-vinyl ester coating significantly improves container-to-container lubricity without appreciably affecting the mechanical properties of the coating.

13 Claims, No Drawings

SURFACE HYDROLYZED OLEFIN-VINYL ESTER CONTAINER COATINGS

This is a continuation of application Ser. No. 140,509, filed Apr. 15, 1980, now abandoned.

BACKGROUND OF THE INVENTION

1. Field of the Invention

This invention relates to the field of containers possessing protective coatings for improved impact absorbance and shatter resistance.

2. Description of the Prior Art

Olefin-vinyl ester copolymers possess excellent impact absorbing characteristics which have led to their being investigated for use as container coatings, especially for fragile containers such as glass bottles, to improve resistance to shattering. Ethylene-vinyl acetate copolymers are widely employed as a coating for various substrates and can be applied thereto employing anyone of several known and conventional procedures, e.g., dip coating, powder spraying, electrostatic coating, and the like. However, the tendency of this and many other olefin-vinyl ester copolymer coatings to adhere to each other or exhibit tack has presented a considerable obstacle to the total acceptance of the copolymers in the packaging industry where high, sustained rates of production with minimal disruptions are essential requirements of an economically viable bottle-filling system. U.S. Pat. No. 3,805,985 describes a glass container coated with a uniformly hydrolyzed ethylene-vinyl acetate copolymer. However, uniformly hydrolyzed olefin-vinyl ester copolymers, while resistant to blocking and demonstrating good lubricity characteristics, are at the same time inferior in impact absorbance to the unhydrolyzed resins from which they are prepared.

SUMMARY OF THE INVENTION

In accordance with the present invention, a container is provided with a protective coating having a frosty appearance simultaneously possessing substantially the same degree of impact absorbance and shatter resistance as olefin-vinyl ester copolymer and substantially the same degree of container-to-container lubricity as the corresponding hydrolyzed olefin-vinyl ester copolymer. Following application of an olefin-vinyl ester copolymer coating to a container substrate, the exterior surface of the copolymer is hydrolyzed with the underlying portion of the coating remaining unaffected. Operating in this manner, a coating will be provided which retains mechanical properties virtually identical to those of the coating as originally applied to the container but with substantially improved lubricity characteristics due to the presence of a superficial layer of hydrolyzed resin on the exposed surface thereof. In addition to possessing functionally superior properties compared to a uniformly hydrolyzed olefin-vinyl ester resin coating, the container coating herein can be obtained at lower cost since only a relatively minor percentage of the resin content of the coatings need be hydrolyzed. The surface hydrolyzed EVA coatings are not clear and glossy, but have an unexpected frosty appearance which can be attractive in numerous applications.

The coatings herein can be applied to many different types of substrates, both rigid and flexible, and are especially useful as shatter-resistant protective coatings when applied to glass tubing, glass bottles and other similarly fragile objects. The coatings can be applied to a container in a variety of ways, for example, as a dry powder by fluidized bed, electrostatic fluidized bed, or electrostatic spraying, or as an aqueous or organic dispersion by spraying, followed by exposure of the coated container to an acid or base catalyzed hydrolysis reaction medium, e.g., spraying of such a reaction medium onto the coated container and thereafter passing the container through a steam chest, or immersing the container in the reaction medium.

DESCRIPTION OF THE PREFERRED EMBODIMENTS

The polyolefin coatings which are suitable for use herein can be prepared from any of the known and conventional olefin-vinyl acetate copolymer powders which are or can be employed in coating applications. Thus, for example, the olefin-vinyl ester resin powders can be selected from copolymers of one or more olefins such as ethylene, propylene, 1-butene, 1-pentene, 1-hexene, and the like, and one or more vinyl esters such as vinyl formate, vinyl acetate, vinyl proprionate, vinyl butyrate, vinyl isobutyrate, vinyl laurate, and the like. In general, the copolymers can be prepared with from about 30 to about 95, and preferably, from about 60 to about 90, weight percent olefin and from about 70 to about 5, and preferably from about 40 to about 10, weight percent vinyl ester. In addition to the foregoing, the copolymers can be prepared with small amounts, e.g., up to about 10 weight percent of the entire monomer mixture, of at least one other ethylenically unsaturated monomer copolymerizable with olefin and vinyl ester. Ethylene-vinyl acetate copolymers are especially preferred due to their widespread acceptance for food packaging applications, their relatively low cost and their ready commercial availability. Such powders can be spherical or irregularly shaped and can have an average particle size of from less than 20 microns to greater than 1,200 microns.

Optionally, the coating resins of this invention can contain one or more slip agents, free-flow agents, fillers, dyes, pigments, and the like, in the customary amounts.

The olefin-vinyl ester resin powders can be applied to rigid surface objects such as glass containers by any known technique, however, it is preferred to use any one of several electrostatic coating techniques in current use. This includes electrostatic spray and cloud coating methods.

In the electrostatic spray coating method, coating powder and air are introduced into a high voltage spray "gun". As the powder particles are ejected from the gun, they pass a negative electrode. The container to be coated is grounded, and is therefore positively charged. As the negatively charged powder particles approach the positively charged container, they are attracted to the surfaces of the container and adhere tenaciously thereto. As the coating forms, the substrate becomes insulated and the powder in the applied coating repels excess powder. The uniform coating that results must then be heated to the fusion temperature of the olefin-vinyl ester copolymer to complete the process. The thickness of the film that can be applied can vary from 1.5 mils to approximately 15 mls and even higher, depending on the temperature of the part, electrical potential difference and duration of spraying time. Higher substrate temperatures allow the deposition of thicker coatings.

In the electrostatic cloud coating method, a low volume of dry air or gas, passed through a porous plate, suspends and fluidizes the powder. Upon application of high voltage to an electrode grid in the bottom of the bed, the powder becomes charged and is dispersed into a fine cloud within the top portion of the bed. The powder is then attracted to the grounded container which has been passed through the cloud. A container coated by this method will be coated evenly over its entire surface due to the self-insulating effect of the powder. The "Pherostatic" coating method (Electrostatic Equipment Corporation, New Haven, Connecticut) which is a variation of the aforedescribed fluidized bed coating method involves the use of two electrostatic beds which are placed next to each other with a powder collector below and common to both ends of the beds. A grounded container is inserted between the beds so that the charged plastic particles that overflow, creating a cloud in between the beds, will be attracted to the grounded object.

Fluidized bed coating can also be used. This method is analogous to the dipping process used with liquid coatings. In using this method the powdered coating resin is expanded by passing an air stream upwardly through it. The container to be coated is preheated to a temperature above the melting point of the powder and then lowered into the expanded bed of material. Each portion of the heated container that touches the powder causes the powder to melt and adhere. After the container is removed from the fluidized bed, it is post heated to produce the desired flow and coating properties.

Following application of the olefin-vinyl ester coating to the exterior surface of the container, the coating is surface hydrolyzed to a desired extent employing an acid or based catalyzed hydrolysis medium. The extent of hydrolysis can be regulated by adjusting the period of exposure of the coating to the hydrolysis medium, altering the concentration of acid or base in the medium and/or adjusting the temperature at which hydrolysis is carried out. In general, only as much surface hydrolysis should be obtained which results in a significant improvement in container-to-container lubricity but does not appreciably compromise the impact absorbing properties of the olefin-vinyl ester coating prior to hydrolysis. The optimum degree of hydrolysis for a given coating can be readily determined employing simple and routine methods. Surface hydrolysis to a depth of about 30 percent, and preferably to a depth of about 10 percent of the average thickness of the coating is effective in most cases. Methods of hydrolyzing olefin vinyl ester resins are well known in the art and do not in themselves constitute a part of this invention. The container coatings herein can be readily surface-hydrolyzed by spraying a quantity of hydrolysis reaction medium, e.g., a dilute aqueous solution of an alkali metal hydroxide such as sodium hydroxide, on to the coated container and thereafter treating the container with steam for the desired degree of surface hydrolysis. Alternatively, the coated container can be immersed in such a hydrolysis medium at elevated temperature until the requisite level of surface hydrolysis is achieved. Prior to such immersion, it is frequently advantageous to preheat the coated container, e.g., to a temperature of from about 150° to about 500° F., to reduce tack at a faster rate in the surface hydrolyzed olefin-vinyl ester resin coatings.

Examples 1 to 8 which are summarized below are illustrative of the invention employing three different ethylene-vinyl acetate copolymer coatings designated A, B and C, and employing aqueous solutions of sodium hydroxide heated to 185°±5° F. as the hydrolysis media. As the results indicate, differences in various process parameters will influence the effect obtained in varying degrees. Preheating the coated container prior to immersion in the hydrolysis medium was observed to have a particularly beneficial influence on the elimination of tack. Slip Angle is a conventional measurement indicative of container-to-container lubricity and represents the angle at which the top container of a three-container pyramid begins to slip off the bottom two containers which are restrained from moving.

| Example No. | Ethylene-Vinyl Acetate Copolymer | Sodium Hydroxide Concentration, % weight | Coated Container Preheat | | Immersion Time, minutes | Slip Angle, degrees | Results |
|---|---|---|---|---|---|---|---|
| | | | Temperature of | Time, Minutes | | | |
| | A[1] | 40 | 420 | 2 | 5 | 35-38 | Cloudy/frosty; reduced tack |
| | A | 40 | 420 | 2 | 2 | 28-35 | Cloudy/frosty; reduced tack |
| | A | 40 | 420 | 2 | 1 | | Slighty cloudy; non-uniform |
| | B[2] | 50 | 185 ± 5 | 15 | 15 | ≧45 | Cloudy/frosty; less tack |
| | B | 50 | 185 ± 5 | 15 | 10 | | Slighty cloudy/frost; less tack |
| | B | 50 | 185 ± 5 | 15 | 5 | | Very slighty cloudy/frosty; less tack |
| | A | 40 | 300 | 3 | 15 | | Cloudy/frosty; more uniform than Example 3 |
| | C[3] | 40 | 420 | 3 | 2 | | Very slight haze and very slight reduction in tack |

[1] Approximately 9 weight percent copolymerized vinyl acetate.
[2] Approximately 19 weight percent copolymerized vinyl acetate.
[3] Approximately 30% weight percent copolymerized vinyl acetate.

What is claimed is:

1. A container provided with an impact absorbent shatter resistant coating having a frosty appearance which comprises a surface hydrolyzed olefin-vinyl ester copolymer, wherein the degree of hydrolysis of said olefin-vinyl ester copolymer is essentially to a depth of from about 10 percent to about 30 percent of the average thickness of the coating.

2. The container of claim 1 wherein the olefin-vinyl ester copolymer is prepared from about 30 to about 95 weight percent olefin and from about 70 to about 5 weight percent vinyl ester.

3. The container of claim 1 wherein the olefin-vinyl ester copolymer is prepared from about 60 to about 90 weight percent olefin and from about 40 to about 10 weight percent vinyl ester.

4. The container of claim 1 wherein the olefin-vinyl ester copolymer is ethylene-vinyl acetate copolymer.

5. The container of claim 1 wherein the coating contains a slip agent and/or a free-flow agent.

6. A process for providing a container with an impact absorbent, shatter resistant coating having a frosty appearance which comprises coating the container with an essentially unhydrolyzed olefin-vinyl ester copolymer and thereafter subjecting the exterior surface of the olefin-vinyl ester coating to hydrolysis so that the degree of said hydrolysis of said olefin-vinyl ester copolymer is essentially to a depth of from about 10 percent to about 30 percent of the average thickness of the coating.

7. The process of claim 6 wherein the olefin-vinyl ester copolymer is applied to the exterior surface of the container by electrostatic deposition.

8. The process of claim 6 wherein hydrolysis is carried out by immersing the coated container in an acid or base catalyzed hydrolysis medium.

9. The process of claim 6 wherein hydrolysis is carried out by applying a solution of hydrolysis medium to the coated container and passing the coated container through steam.

10. The process of claim 6 wherein the olefin-vinyl ester copolymer is prepared from about 30 to about 95 weight percent olefin and from about 70 to about 5 weight percent vinyl ester.

11. The process of claim 6 wherein the olefin-vinyl ester copolymer is prepared from about 60 to about 90 weight percent olefin and from about 40 to about 10 weight percent vinyl ester.

12. The process of claim 6 wherein the olefin-vinyl ester copolymer is ethylene-vinyl acetate copolymer.

13. The process of claim 6 wherein the coating contains a slip agent and/or a free-flow agent.

* * * * *